May 13, 1952  J. H. EAGLE  2,596,665
CONDENSER LENS MOUNT
Filed March 29, 1950

JOHN H. EAGLE
INVENTOR
Daniel J. Mayne
BY J. Griffin Little
ATTORNEYS

Patented May 13, 1952

2,596,665

UNITED STATES PATENT OFFICE 2,596,665

CONDENSER LENS MOUNT

John H. Eagle, Rochester, N. Y., assignor to Eastman Kodak Company, Rochester, N. Y., a corporation of New Jersey Application March 29, 1950, Serial No. 152,637

10 Claims. (Cl. 88—57)

The present invention relates to lens mounts, and more particularly to a mount for holding and positioning a pair of condenser lenses.

The invention has as its principal object the provision of a simple and novel mount for supporting and accurately positioning a pair of condenser lenses.

Another object of the invention is the provision of lens-positioning members which are simple in construction, rugged, easy to assemble, inexpensive to manufacture and highly effective in use.

Still another object of the invention is the provision of lens-positioning and supporting means which provides some flexibility to protect the lenses against damage.

To these and other ends, the invention resides in certain improvements and combinations of parts all as will be hereinafter more fully described, the novel features being pointed out in the claims at the end of the specification.

In the drawings.

Similar reference numerals throughout the various views indicate the same parts.

Figure 1:
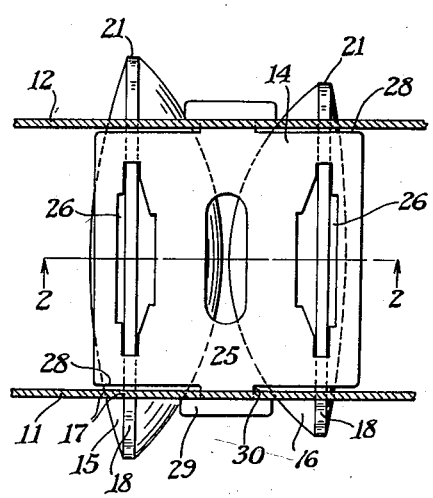
Fig. 1 is a plan view of a lens mount construed in accordance with the preferred embodiment of the present invention.
Figure 5:
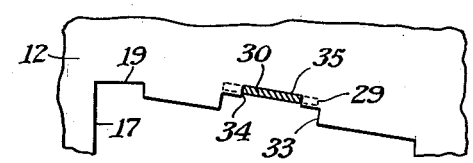
Fig. 5 is a partial side view of one of the side plates showing the slots or recesses for receiving the lugs of the bowed lens-positioning members.
Figure 2:
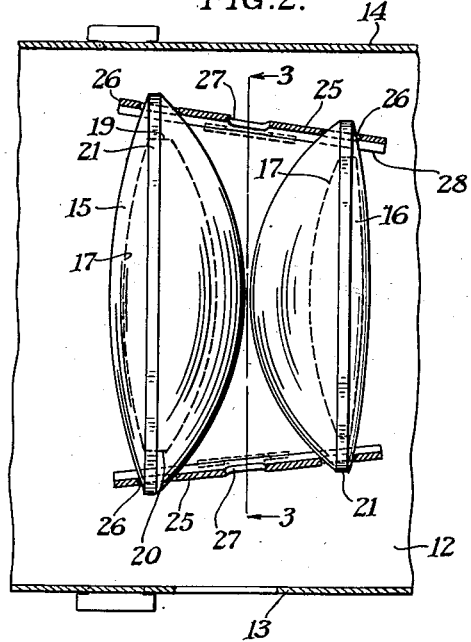
Fig. 2 is a vertical sectional view through the mount of the present invention, and taken substantially on line 2—2 of Fig. 1, showing the relation of the bowed lens-positioning members to the lenses, and the side plates.
Figure 3:
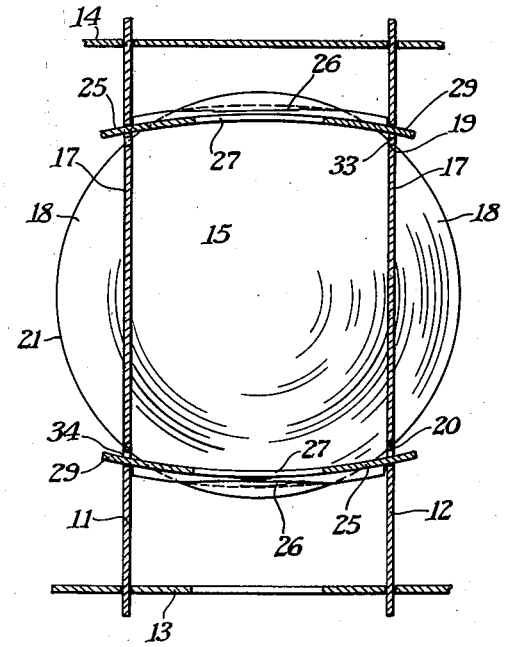
Fig. 3 is a vertical sectional view taken substantially on line 3—3 of Fig. 2, showing the bowed relation of the lens-positioning members, and the relation of the latter to the side plates.

The drawings show a condenser lens mount which comprises a pair of upright, substantially parallel plates 11 and 12, the lower and upper ends of which are connected by cross members 13 and 14, respectively, to hold the plates in proper spaced and parallel relation, as best shown in Fig. 3. A pair of condenser lenses 15 and 16 are positioned between plates 11 and 12, as best shown in Figs. 1 and 2. The plates 11 and 12 may be spaced apart a distance equal to or slightly greater than the diameter of the larger lens. However, for reasons later to be more fully described, it is preferred to space the plates a distance less than the diameter of the smaller lens 16, shown in Figs. 1 and 3. For this reason, each plate 11 and 12 is formed with a large opening or aperture 17 through which the segmental portions 18 of the lenses project, as clearly illustrated in Fig. 3. The apertures 17 of the two plates 11 and 12 are identical in shape, and have the top edges 19 and the lower edges 20 in vertical alignment and of a shape as shown in Fig. 5 so as to approach the peripheral edges 21 of the lenses for reasons to be later pointed out. Also, as shown in Fig. 3, the vertical distance between the edges 19 and 20 is less than the diameters of the adjacent lens. As lenses 15 and 16 are of different diameters, obviously the edges 19 and 20 are inclined as best shown in Fig. 5 to accommodate different size lenses. In the proposed arrangement, only a single aperture 17 is provided in each plate 11 and 12 so that the section of each plate between the lenses is removed, thus enabling the plate openings to be formed in a single cutting operation. However, it is contemplated that each plate may be provided with separate openings so spaced and of such shapes as to receive the projecting portions 18 of the lenses, as shown in dotted lines in Fig. 2.

Figure 4:
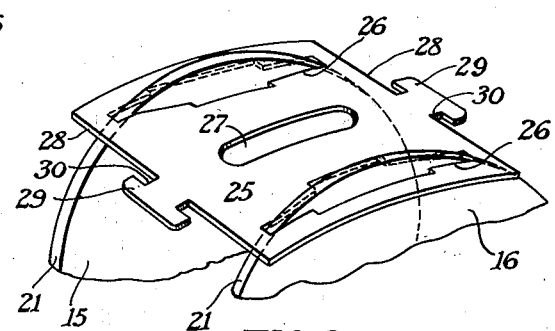
Fig. 4 is a top perspective view of the lenses and one of the flexible members, showing the parts of the latter and the relation thereof to the lenses.

In order to mount lenses 15 and 16 on plates 11 and 12, the present invention provides a pair of positioning and supporting members 25 of the shape best shown in Fig. 4. Each member 25 is formed of a thin sheet of flexible material, such as sheet metal, which in its "normal" or unflexed relation lies in a plane. Also, each member 25 is formed with axially spaced apertures or slots 26 through which the top and bottom peripheral edges 21 of lenses 15 and 16 project, as shown in Figs. 3 and 4, to position the lenses accurately on the members 25, as is deemed apparent. An intermediate air vent or slot 27 may be provided in each member 25. The opposite marginal edges 28 of each member 25 are provided with laterally projecting T-shaped lugs having a head part 29 and a stem 30 connected to edge 28 as best shown in Fig. 4. When the members 25 are positioned on the lenses they are in flat shape and the T-shaped lugs are out of registry with edges 19 and 20 of the aperture 17, so that the lugs will be spaced a distance greater than the spacing of the edges 19 and 20.

The edges 19 and 20 are formed with identical vertically aligned open slots each having an enlarged section 33 which is large enough to permit the free passage of part 29 of the lug of the adjacent member 25. The section 33 terminates in an open slot 34 adapted to receive the stem 30 as shown in Fig. 5. As the edges 19 and 20 are spaced a distance less than the unflexed member 25, it is necessary to impart a concave flex or bow to the member 25 to bend the members toward one another, as shown in Fig. 3, so that the parts 29 will register with and pass through sections 33 of the side plates. Then, by releasing the T-shaped lugs, the bowed members 25 tend to return to the normal or planar position to move the stems 30 into the smaller recesses 34 to hold the members 25 yieldably but detachable in engaging relation with the side plates 11 and 12, both to support and position the two condenser lenses on the members 25 and also relative to the side plates 11 and 12. The T-shaped lugs on the members 25 and the cooperating slots 33 and 34 on the plates 11 and 12 provide, in effect, bayonet connections between the plates and the member to connect the latter releasably to the plate to support and position the lenses relative thereto.

As is well known, condenser lenses are relatively large and heavy so that if subjected to a heavy impact force, such as by dropping, the lenses may be damaged or they may be dislocated in the mounting means. For this reason the plates 11 and 12 are spaced apart a distance less than the diameter of the smaller lens 16 so that the lenses extend through the aperture 17, as shown in Figs. 1 to 3 and mentioned above. As shown in Fig. 3 the edges 19 and 20 of plates 11 and 12 are positioned in close proximity to the peripheral edges 21 of the lenses. The result is that the edges 19 and 20 limit the up and down, as well as sidewise movement, of the lenses yet allow slight play to permit free expansion of the lenses, but permit a slight play to take up any impact force imparted to the lens mount. The two members 25 also serve to absorb any shock which might be otherwise transmitted directly to the lenses. The result is that the lenses are retained accurately in position, and are cushioned so as to prevent damage thereto, the advantages of which are apparent to those familiar with lens mounts.

The present invention thus provides a mount which accurately positions the lenses and cushions them against shock to prevent damage to the lenses. The mount is formed of few parts of rugged construction, simple in design, inexpensive to manufacture, easy to assemble and highly effective in use.

While one embodiment of the invention has been disclosed, it is apparent that the invention may be modified in a variety of ways without departing from the scope of the present invention. For this reason the claims are to be limited only insofar as is necessitated by the prior art.

What I claim and desire to secure by Letters Patent of the United States is:

1. A lens mount comprising in combination, a pair of substantially parallel rigid plates between which a lens is positioned, a pair of bowed flexible members engaging diametrically opposite peripheral portions of said lens to support said lens, and bayonet connections between said plates and members to connect the latter releasably to said plates to position and support said lens on said plates.

2. A lens mount comprising in combination, a pair of substantially parallel rigid plates between which a lens is positioned, a pair of bowed flexible members engaging diametrically opposite peripheral portions of said lens to support said lens, said members being formed with aligned slots to receive said portions to position said lens on said members, and bayonet connections between said plates and members to connect the latter releasably to said plates to mount said lens thereon.

3. A lens mount comprising in combination, a pair of substantially parallel rigid plates between which a lens is positioned, a pair of bowed flexible members engaging diametrically opposite peripheral portions of said lens to support said lens, and bayonet connections between said plates and members comprising laterally projecting flexible tongues formed on said members and extending into registering slots formed in said plates to connect said member detachably to said plates to support said lens on the latter.

4. A lens mount comprising in combination, a pair of substantially parallel rigid plates between which a lens is positioned, a pair of bowed flexible members engaging diametrically opposite peripheral portions of said lens to support said lens, means on said members engaging said lens to position the lens on said member, and bayonet connections between said plates and members to connect the latter releasably to said plates to position and support said lens on said plates.

5. A lens mount comprising in combination, a pair of substantially parallel rigid plates between which a lens is positioned, a pair of bowed flexible members engaging diametrically opposite peripheral portions of said lens to support said lens, said member having parts extending beyond said plates, and means to connect said parts releasably to said plates both to bow said members and to support said lens on said plate.

6. A lens mount comprising in combination, a pair of substantially parallel rigid plates between which a lens is positioned, a pair of normally flat flexible members positioned to engage diametrically opposite peripheral edges of said lens, lugs projecting from the opposite sides of said members and extending beyond said plates, said plates having pairs of aligned slots positioned out of the planes of said flat members, and portions on said lugs engaging said slots to bend said members to a bowed form to clamp said lens to hold the latter and to support said lens on said plates.

7. A lens mount comprising in combination, a pair of substantially parallel rigid plates between which a lens is positioned, a pair of normally flat flexible members positioned to engage diametrically opposite peripheral edges of said lens, lugs projecting from the opposite sides of said members and extending beyond said plates, said plates having pairs of aligned slots positioned out of the planes of said flat members, and portions on said lugs engaging said slots to connect said members detachably to said plate, the engaging of said lugs and slots serving to impart a concave bending to said members to clamp said lens therebetween.

8. A lens mount comprising in combination, a pair of substantially parallel rigid plates between which a lens is positioned, a pair of normally flat flexible members positioned to engage diametrically opposite peripheral edges of said lens, lugs projecting from the opposite sides of said members and extending beyond said plates, said plates having pairs of aligned slots positioned out of the planes of said flat members, and portions on said lugs engaging said slots to connect said members detachably to said plates, the engaging of said lugs and slots serving to impart a concave bending to said members to clamp said lens therebetween, and means on said members for positioning said lens thereon.

9. A lens mount comprising in combination, a pair of substantially parallel rigid plates between which a lens is positioned, a pair of normally flat flexible members positioned to engage diametrically opposite peripheral edges of said lens, lugs projecting from the opposite sides of said members and extending beyond said plates, said plates having pairs of aligned slots positioned out of the planes of said flat members and spaced vertically a distance less than said flat members, said lug engaging in said slots to connect said members detachably to said plates to support said lens thereon, said engagement serving to flex said members toward each other to engage said edges to clamp and position said lens on said members.

10. A lens mount comprising in combination, a pair of substantially parallel rigid plates between which a lens is positioned, a pair of normally flat flexible members positioned in engagement with diametrically opposite edges of said lens, each of said plates being formed with an aperture positioned in alignment with and receiving said edges, walls on said apertures engaging said edges to position said lens on said members, laterally extending lugs formed on said members, and means on said plates cooperating with said lugs to secure said member detachably to said plates so that the latter will support said lens, the means on said plates being arranged out of the planes of the flat members so that said securing of said lugs will impart a bending of said members toward each other to cause said members to clamp said lens.

JOHN H. EAGLE.

REFERENCES CITED

The following references are of record in the file of this patent:

UNITED STATES PATENTS

| Number | Name | Date |
| --- | --- | --- |
| 786,052 | Roebuck | Mar. 28, 1905 |
| 1,032,065 | Kamm | July 9, 1912 |
| 1,118,187 | Depue | Nov. 24, 1914 |
| 2,231,743 | Young et al. | Feb. 11, 1941 |
| 2,456,711 | Knutson et al. | Dec. 21, 1948 |
| 2,468,565 | Marcus et al. | Apr. 26, 1949 |
| 2,477,107 | Wolfe | July 26, 1949 |